(12) United States Patent
Long et al.

(10) Patent No.: US 11,914,955 B2
(45) Date of Patent: Feb. 27, 2024

(54) SYSTEM AND METHOD FOR MACHINE LEARNING ARCHITECTURE WITH VARIATIONAL AUTOENCODER POOLING

(71) Applicant: ROYAL BANK OF CANADA, Toronto (CA)

(72) Inventors: Teng Long, Toronto (CA); Yanshuai Cao, Toronto (CA); Jackie C. K. Cheung, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 209 days.

(21) Appl. No.: 16/880,530

(22) Filed: May 21, 2020

(65) Prior Publication Data

US 2020/0372214 A1 Nov. 26, 2020

Related U.S. Application Data

(60) Provisional application No. 62/850,902, filed on May 21, 2019.

(51) Int. Cl.
*G06F 40/211* (2020.01)
*G06F 40/284* (2020.01)
*G06N 3/08* (2023.01)

(52) U.S. Cl.
CPC .......... *G06F 40/211* (2020.01); *G06F 40/284* (2020.01); *G06N 3/08* (2013.01)

(58) Field of Classification Search
CPC ........ G06F 40/211; G06F 40/284; G06N 3/08
See application file for complete search history.

(56) References Cited

U.S. PATENT DOCUMENTS

2015/0112891 A1* 4/2015 Watanabe .............. G06N 5/048
706/1
2017/0371861 A1* 12/2017 Barborak ................ G06F 40/35
(Continued)

OTHER PUBLICATIONS

Alexander A Alemi, Ben Poole, Ian Fischer, Joshua V Dillon, Rif A Saurous, and Kevin Murphy. 2017. Fixing a broken ELBO. arXiv preprint arXiv:1711.00464.

(Continued)

*Primary Examiner* — Bhavesh M Mehta
*Assistant Examiner* — Edward Tracy, Jr.
(74) *Attorney, Agent, or Firm* — Norton Rose Fulbright Canada LLP (57) ABSTRACT

A computer implemented method is described for conducting text sequence machine learning, the method comprising: receiving an input sequence $x=[x_1, x_2, \ldots, x_n]$, to produce a feature vector for a series of hidden states $h_x=[h_1, h_2, \ldots, h_n]$, wherein the feature vector for the series of hidden states $h_x$ is generated by performing pooling over a temporal dimension of all hidden states output by the encoder machine learning data architecture; and extracting from the series of hidden states $h_x$, a mean and a variance parameter, and to encapsulate the mean and the variance parameter as an approximate posterior data structure.

21 Claims, 7 Drawing Sheets

(56) References Cited

U.S. PATENT DOCUMENTS

| | | | | |
|---|---|---|---|---|
| 2019/0370940 | A1* | 12/2019 | Choi | G06N 20/00 |
| 2020/0086879 | A1* | 3/2020 | Lakshmi Narayanan | G06V 40/20 |
| 2020/0104640 | A1* | 4/2020 | Poole | G06N 3/045 |
| 2020/0125852 | A1* | 4/2020 | Carreira | G06N 3/08 |
| 2020/0143191 | A1* | 5/2020 | Du | G06K 9/6262 |
| 2020/0159997 | A1* | 5/2020 | Wu | G06N 3/0454 |

OTHER PUBLICATIONS

Samuel R Bowman, Luke Vilnis, Oriol Vinyals, Andrew M Dai, Rafal Jozefowicz, and Samy Bengio. 2015. Generating sentences from a continuous space. arXiv preprint arXiv:1511.06349.

Ronan Collobert and Jason Weston. 2008. A unified architecture for natural language processing: Deep neural networks with multitask learning. In Proceedings of the 25th international conference on Machine learning, pp. 160-167. ACM.

Alexis Conneau, Douwe Kiela, Holger Schwenk, Loic Barrault, and Antoine Bordes. 2017. Supervised learning of universal sentence representations from natural language inference data. arXiv preprint arXiv:1705.02364.

Kelvin Guu, Tatsunori B Hashimoto, Yonatan Oren, and Percy Liang. 2018. Generating sentences by editing prototypes. Transactions of the Association of Computational Linguistics, 6:437-450.

Junxian He, Daniel Spokoyny, Graham Neubig, and Taylor Berg-Kirkpatrick. 2019. Lagging inference networks and posterior collapse in variational autoencoders. arXiv preprint arXiv:1901.05534.

Zhiting Hu, Zichao Yang, Xiaodan Liang, Ruslan Salakhutdinov, and Eric P Xing. 2017. Toward controlled generation of text. In Proceedings of the 34th International Conference on Machine Learning-vol. 70, pp. 1587-1596. JMLR. org.

Diederik P Kingma and Max Welling. 2013. Auto-encoding variational bayes. arXiv preprint arXiv:1312.6114.

Xiaodong Liu, Jianfeng Gao, Asli Celikyilmaz, Lawrence Carin, et al. 2019. Cyclical annealing schedule: A simple approach to mitigating kl vanishing. arXiv preprint arXiv:1903.10145.

Yishu Miao and Phil Blunsom. 2016. Language as a latent variable: Discrete generative models for sentence compression. arXiv preprint arXiv:1609.07317.

Yishu Miao, Lei Yu, and Phil Blunsom. 2016. Neural variational inference for text processing. In International conference on machine learning, pp. 1727-1736.

Omáš Mikolov, Martin Karafiát, Lukáš Burget, Jan Cernockỳy, and Sanjeev Khudanpur. 2010. Recurrent neural network based language model. In Eleventh annual conference of the international speech communication association.

Yookoon Park, Jaemin Cho, and Gunhee Kim. 2018. A hierarchical latent structure for variational conversation modeling. arXiv preprint arXiv:1804.03424.

Stanislau Semeniuta, Aliaksei Severyn, and Erhardt Barth. 2017. A hybrid convolutional variational autoencoder for text generation. arXiv preprint arXiv:1702.02390.

Tsung-Hsien Wen, Yishu Miao, Phil Blunsom, and Steve Young. 2017. Latent intention dialogue models. In Proceedings of the 34th International Conference on Machine Learning-vol. 70, pp. 3732-3741. JMLR. org.

Jiacheng Xu and Greg Durrett. 2018. Spherical latent spaces for stable variational autoencoders. arXiv preprint arXiv:1808.10805.

Weidi Xu, Haoze Sun, Chao Deng, and Ying Tan. 2017. Variational autoencoder for semi-supervised text classification. In Thirty-First AAAI Conference on Artificial Intelligence.

Zichao Yang, Zhiting Hu, Ruslan Salakhutdinov, and Taylor Berg-Kirkpatrick. 2017. Improved variational autoencoders for text modeling using dilated convolutions. In Proceedings of the 34th International Conference on Machine Learning-vol. 70, pp. 3881-3890. JMLR.org.

Zichao Yang, Diyi Yang, Chris Dyer, Xiaodong He, Alex Smola, and Eduard Hovy. 2016. Hierarchical attention networks for document classification. In Proceedings of the 2016 Conference of the North American Chapter of the Association for Computational Linguistics: Human Language Technologies, pp. 1480-1489.

Shengjia Zhao, Jiaming Song, and Stefano Ermon. 2017a. Infovae: Information maximizing variational autoencoders. arXiv preprint arXiv:1706.02262.

Tiancheng Zhao, Ran Zhao, and Maxine Eskenazi. 2017b. Learning discourse-level diversity for neural dialog models using conditional variational autoencoders. arXiv preprint arXiv:1703.10960.

* cited by examiner

SYSTEM AND METHOD FOR MACHINE LEARNING ARCHITECTURE WITH VARIATIONAL AUTOENCODER POOLING

FIELD

Embodiments of the present disclosure generally relate to the field of machine learning, and more specifically, embodiments relate to devices, systems and methods for variational autoencoders and text sequence machine learning.

INTRODUCTION

A variational autoencoder is a computer technology that has different potential uses. For example, a variational autoencoder can be used as an approach to unsupervised learning of complicated distributions.

Variational autoencoders are built using machine learning data architectures, such as neural networks. For example, variational autoencoders can include encoders and decoders which are trained over a number of epochs to generate outputs that can match or represent a similar probability distribution as a set of input data samples. The training can be based on various loss functions, and minimization thereof across training epochs. The variational autoencoder can learn parameters of a probability distribution representing the input data, and, accordingly, can be usable to generate new input data samples.

Variational autoencoders (VAEs) are a class of latent variable generative models that allow tractable sampling through the decoder network and efficient approximate inference via the recognition network.

In the context of natural language processing (NLP), a recurrent neural network (RNN) can be used as a decoder, in the hope that the latent variables could capture global properties while the low level local semantic and syntactic structures can be modelled by the RNN language model. The idea of capturing high level context in the latent variable can be applied to many NLP-related tasks, such as language modeling, question answering, text compression, semi-supervised text classification, controllable language generation, and dialogue response generation.

SUMMARY

Embodiments described herein provide a computer implemented system for conducting text sequence machine learning. The system involves on a processor operating in conjunction with computer memory storing instructions. The processor executes the machine interpretable instruction sets to provide a variational autoencoder with particular configurations.

The system has an encoder machine learning data architecture (for configuring the variational autoencoder). The encoder is configured to receive an input sequence $x=[x_1, x_2, \ldots, x_n]$, to produce a feature vector for a series of hidden states $h_x=[h_1, h_2, \ldots, h_n]$, wherein the feature vector for the series of hidden states $h_x$ is generated by performing pooling over a temporal dimension of all hidden states output by the encoder machine learning data architecture.

Different pooling operations are contemplated as variant embodiments. Example embodiments of pooling operations are max pooling, average pooling, absolute pooling, and so on.

The encoder has a processor that can implement pooling operations over a temporal dimension of all hidden states to generate the feature vector. Each hidden state can have multiple dimensions. For example, a hidden state can have multiple temporal dimensions and a temporal dimension of a hidden state can be referred to as a k-th dimension of the hidden state. The feature vector $h_x^k$ for the series of hidden states can also have corresponding multiple temporal dimensions. A temporal dimension of the feature vector feature vector for the hidden states can be referred to as a k-th dimension of the feature vector $h_x^k$. In example embodiments, the processor can compute a k-th dimension of feature vector $h_x^k$ using a pooling operation of the k-th dimension of all hidden states. The temporal dimensions of the feature vector can correspond to the temporal dimensions of the hidden states. The pooling operation can be the mean of the k-th dimension of all hidden states. The pooling operation can be the maximum value along the k-th dimension of all hidden states. There can be other pooling operations to aggregate the k-th dimension of all hidden states to compute the k-th dimension of the feature vector $h_x^k$.

The system has an approximate posterior data structure determination engine that is configured to extract from the series of hidden states $h_x$, a mean and a variance parameter, and to encapsulate the mean and the variance parameter as an approximate posterior data structure.

In an aspect, the encoder machine learning data architecture is configured to output a hidden representation based on the series of hidden states $h_x$.

In an aspect, the system includes a decoder machine learning data architecture that receives the hidden representation from the encoder and generates a reconstructed output sequence.

In an aspect, the reconstructed output sequence is a new generated sequence that is inferred based on the hidden representation that is distinct than the input sequence.

In an aspect, the series of hidden states $h_x=[h_1, h_2, \ldots, h_n]$.

In an aspect, the series of hidden states $h_x=\text{aggregate}([h_1, h_2, \ldots, h_n])$.

In an aspect, the aggregate function is an average pooling function.

In an aspect, the aggregate function is a max pooling function.

In an aspect, the max pooling function is performed based on absolute values of each element while preserving signs of the pooled elements.

In an aspect, the input sequence is a sequence of string or character based tokens.

In an aspect, embodiments described herein can provide a computer systems and non-transitory computer readable medium storing representations of hidden layers of a trained encoder machine learning data architecture for a processor. An encoder machine learning data architecture is trained based on receiving an input sequence x=[x1, x2, xn], to produce a feature vector for a series of hidden states hx=[h1, h2, . . . , hn], wherein the series of hidden states hx is generated by the processor performing pooling over a temporal dimension of all hidden states output. The processor can extract from the series of hidden states hx, a mean and a variance parameter. The processor can encapsulate the mean and the variance parameter as an approximate posterior data structure for the variational autoencoder.

In an aspect, embodiments described herein can provide a computer implemented system for a variational autoencoder to conduct text sequence machine learning. The system has an encoder having a processor operating in conjunction with computer memory, the processor executing machine interpretable instruction sets to read an input sequence to generate a feature vector for the input sequence by performing pooling operations over a temporal dimension of hidden states. The processor takes a sequence of vectors of variable lengths and produces a combined representation of the sequence of vectors of variable lengths as the feature vector. The system has an approximate posterior data structure determination engine configured to extract from the feature vector a mean and a variance parameter, and to encapsulate the mean and the variance parameter as an approximate posterior data structure for the variational autoencoder.

In some embodiments, a k-th dimension of feature vector is computed using a pooling operation of the k-th dimension of all hidden states.

In some embodiments, the pooling operation is the mean of the k-th dimension of all hidden states.

In some embodiments, the pooling operation is the maximum value along the k-th dimension of all hidden states.

In some embodiments, the pooling operation is an aggregate of the k-th dimension of all hidden states.

Other pooling operations can be performed by the processor to generate the feature vector for the variational autoencoder.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Embodiments described herein provide a computer implemented system for conducting text sequence machine learning. The system involves on a processor operating in conjunction with computer memory, the processor executing machine interpretable instruction sets to provide a variational autoencoder (VAE).

An example technical challenge that arises with VAEs is that sequence VAE training can be brittle, and the latent variable can be completely ignored while the sequence VAE degenerates into a regular language model.

Brittleness, in this context, refers to an undesirable scenario where the machine learning data architecture starts processing information through suboptimally selected channels due to potential bottlenecks in stochastically noisy channels. Accordingly, this phenomenon happens when the inferred posterior distribution collapses onto the prior completely, and is referred to as posterior collapse.

A sequence variational autoencoder (Sequence VAE/SeqVAE) is utilized for generative text modelling, which can be prone to the posterior collapse as a degenerative solution during optimization. As an example, text modelling may include a global, broader processing channel (e.g., the overarching theme of a story), as well as a local, narrower processing channel (e.g., what word comes next). Posterior collapse, due to noise, congestion and cost issues associated utilizing a stochastically noisy channel causes an overemphasis and reliance on the local processing channel, and the model data architecture could end up not being much more than purely based on the local processing channel, which renders the broader processing channel to be ignored.

Embodiments described herein can address the posterior collapse problem through improved systems, processes, methods, devices, and computer readable media. The proposed approach can be implemented in the form of a specially configured computing device, which, for example, can be a specialized data appliance residing in a data center that is adapted for conducting machine learning (e.g., maintaining, over time, one or more neural networks adapted as an improved variational autoencoder that is less susceptible to posterior collapse). In particular, the proposed approach, in accordance with some embodiments, uses a pooling mechanism as an intermediary in the machine learning processing. The system can include processors that can receive text input or access input from memory, process the data using its improved architecture, and generate text output for transmission or storage.

Sequence VAE has interesting properties. For example, a latent variable is tracked that allows the system to decompose local regularity from global context. An example global context is overall sentiment which might represent something not even expressible in the categories of its local content.

An improved decomposition allows a system to capture the overall long range dependencies. As a simplified example, for processing a long document, the local structure may change but the overall long range structure might not change. Accordingly, Sequence VAE has a potential to use the recovered latent global features for other subsequent paths.

The model can have different paths for information or data to flow.

By way of example, two paths are described herein for simplicity (1) global variables—e.g., stochastic noisy channels—e.g., water flowing through pipes—it has some narrow bottlenecks (2) and the RNN channel—e.g., given the words previously, predict the next word (almost noiseless).

Imbalance of two channels for information to flow is possible, and can be caused by the brittleness from training. If the global path is slightly clogged, an optimization process can undesirably prefer to throw out that global path completely as the process will have to pay a cost but it cannot use the path effectively.

If this clogging occurs, the data architecture then falls back to a simple predict next word approach with no global representation, which is an undesirable outcome. The technical problem as resulted in new architectures, new structures for latent spaces, different optimization schemes but are either complex or computationally very costly.

As described herein, the problem can be caused by an initialization issue.

For example, if the system is processing an input, at the beginning of learning, because the neural net has not captured anything useful—what the system passes through the noisy channel is all compressed together—it cannot tell apart the different variability in the input so it cannot pass information through the channel. This occurs at the deterministic part before the noisy channel and the system cannot tell apart the variability of the input.

In contrast to a conventional approach whereby only the last hidden state of an encoder RNN is used for feature representation, embodiments described herein can involve an unconventional pooling approach to address these problems through incorporating into a machine learning data architecture a mechanism whereby the feature vector is generated by performing pooling across the temporal dimension of all hidden states $(h_1, h_2 \ldots, h_n)$.

Accordingly, instead of the typical RNN encoder, the initial input representation is dispersed, for example, into the noisy channel. By having the input variability represented, the machine learning data architecture will have an easier time being used after the noisy channel.

The pooling approach can be used for embodiments herein. There are variations on the pooling approach for variant embodiments. A variant embodiment uses max pooling.

Embodiments described herein provide a computer implemented system for conducting text sequence machine learning. The system has a processor operating in conjunction with computer memory storing instructions or code. The processor executing machine interpretable instruction sets provides a variational autoencoder.

Embodiments described herein provide a encoder machine learning data architecture that is configured to receive an input sequence $x=[x_1, x_2, \ldots, x_n]$, to produce feature vector for a series of hidden states $h_x=[h_1, h_2, \ldots, h_n]$. The feature vector for the series of hidden states $h_x$ is generated by performing pooling over a temporal dimension of all hidden states output by the encoder machine learning data architecture.

Embodiments described herein provide an approximate posterior data structure determination engine that is configured to extract from the series of hidden states $h_x$, a mean and a variance parameter, and to encapsulate the mean and the variance parameter as an approximate posterior data structure.

Compared to the standard autoencoder, VAE introduce an explicitly parameterized latent variable z over data x.

As a result, instead of directly maximizing the log likelihood of data, VAE is trained to maximize to the Evidence Lower Bound (ELBO) on the log likelihood:

$$\log p_\theta(x) = \int_z p_\theta(z) p_\theta(x \mid z) dz$$
$$\geq \mathbb{E}_{q_\phi(z|x)}[\log p_\theta(x \mid z)] - D_{KL}(q_\phi(z|x) \| p_\theta(z))$$
$$= \mathcal{L}(\theta, \phi; x)$$

where $p_\theta(z)$ is the prior distribution, $q_\phi(z|x)$ is typically referred to as the recognition model (encoder), and $p_\theta(x|z)$ is the generative model (decoder); $\phi$ and $\theta$ are the parameters for encoder and decoder respectively.

Note that this description will use the terms encoder and recognition model, decoder and generative model interchangeably. An encoder can refer to hardware configured with an encoder network. A decoder can refer to hardware configured with a decoder network. The VAE receives input, processes the input using the encoder (recognition) to compute latent variables, and generates output using the decoder (reconstruction) using the computed latent variables.

The ELBO objective $\mathcal{L}(\theta, \phi; x)$ consists of two terms: The first one is the reconstruction term $\mathbb{E}_{q_\phi(z|x)}(x|z)$, which trains the generative model (decoder) to reconstruct input data x given latent variable z.

The second term is the KL divergence from $q_\phi(z|x)$ to $p_\theta(x)$, which acts as a regularizer and penalizes the approximate posteriors produced by the recognition model for deviating from the prior distribution too much.

In the standard VAE formulation, the prior distribution is assumed to be an isotropic Gaussian distribution with no learnable parameters, $p_\theta(z) = \mathcal{N}(0, I)$. The approximate posterior for x is defined as a multivariate Gaussian distribution with diagonal covariance matrix whose parameters are functions of x, thus $q_\phi = \mathcal{N}(\mu_\phi(x), \sigma_\phi^2(x))$ with $\phi$ being the parameters of the recognition model.

Such assumptions ensure that both the forward and backward passes can be performed efficiently during training, and the KL regularizer can be computed analytically.

An adaptation of variational autoencoders for generative text modeling is a Sequence VAE (SeqVAE). For neural language models, typically each token $x_t$ is conditioned on the history of previously generated tokens:

$$p(x) = \prod_{t=1}^{T} p(x_t \mid x_1, x_2, \ldots, x_{t-1})$$

Rather than directly modeling the above factorization of sequence x, there can be specified a generative process for input sequence x that is conditioned on some latent variable z:

$$p(x \mid z) = \prod_{t=1}^{T} p(x_t \mid x_1, x_2, \ldots, x_{t-1}, z)$$

where the marginal distribution p(x) could in theory be recovered by integrating out the latent variable.

An objective is that latent variable z would be able to capture certain holistic properties of text data (e.g. sentences), such as topic, style and other high-level syntactic and semantic features.

Given the sequential nature of natural language, autoregressive architectures such as RNNs are the candidates to parameterize both the encoder and the decoder in SeqVAE.

Specifically, the encoder first reads the entire sentence x in order to produce feature vector h for the sequence.

The feature vector is then fed to some linear transformation to produce the mean and covariance of approximate posterior. Latent code z is sampled from the approximate posterior and then passed to the decoder network to reconstruct the original sentence x.

An alternative interpretation of VAE is to view it as a regularized version of the standard autoencoders. In particular, the reconstruction term in the ELBO objective encourages the latent code z to convey meaningful information in order to reconstruct x. On the other hand, the KL divergence term constantly tries to penalize $q_\phi(z|x)$ for deviating from $p_\theta(z)$ too much, which discourages the model from simply memorizing each data point.

However, this creates the possibility of an undesirable local optimum in which approximate posterior is nearly identical to prior distribution, namely $q_\phi(z|x)=p_\theta(z)$ for all x.

Such a degenerate solution is known as posterior collapse, and is often signaled by the close-to-zero KL term in ELBO objective during training.

When optimization reaches the collapsed solution, the approximate posterior resembles the prior distribution and conveys no useful information about the corresponding data x which defeats the purpose of having a recognition model. In this case, the decoder would have no other choice but to simply ignore the latent codes or variables.

The issue of posterior collapse is particularly prevalent when applying VAEs to text data. The posterior collapse could be caused by the contextual capabilities of powerful autoregressive decoders and that a collapsed solution might be cause by a reasonable local optimum in terms of the ELBO objective.

To address this issue, there can be an increase of the weight of KL regularizer from a relatively small number to 1 following a simple linear annealing schedule. However in practice, this method alone does not appear to be sufficient to prevent posterior collapse.

Since the parameters of approximate posterior are produced by feeding each feature vector to a shared linear transformation, representations that are close to each other in the feature space would lead to the approximate posteriors for each sentence concentrating in a small region in the space of approximate posterior distributions. This could make the latent variables for every sentence somewhat indistinguishable from each other.

During training, since the decoder cannot tell the different input data apart based on their corresponding latent variables, the optimization would then try to maximize the ELBO objective by pushing approximate posterior to prior in order to avoid paying the cost of KL divergence. This results in the model reaching the collapsed solution.

As shown herein, such issues do play a role when applying VAEs to real-word text data. Embodiments described herein use innovative pooling operations as modifications to the VAE formulation, optimization steps, and model architectures without introducing additional model parameters.

Though not as prevalent as self-attention based methods, pooling has shown superior performances over attention mechanism in some NLP-related applications such as learning universal sentence encoders.

Experimentations with adding self-attention mechanism to the encoder network were tested and found to be outperformed by pooling methods. This could be due to the fact that the significant amount of additional parameters added by attention mechanism creates another layer of complexity to the already challenging optimization process.

Example Issues with Using Last Hidden State

In a sequence VAE, the encoder RNN processes the input sentence $x=[x_1, x_2, \ldots, x_n]$ one word at a time to produce a series of hidden states $h=[h_1, h_2, \ldots, h_n]$.

Figure 1A:
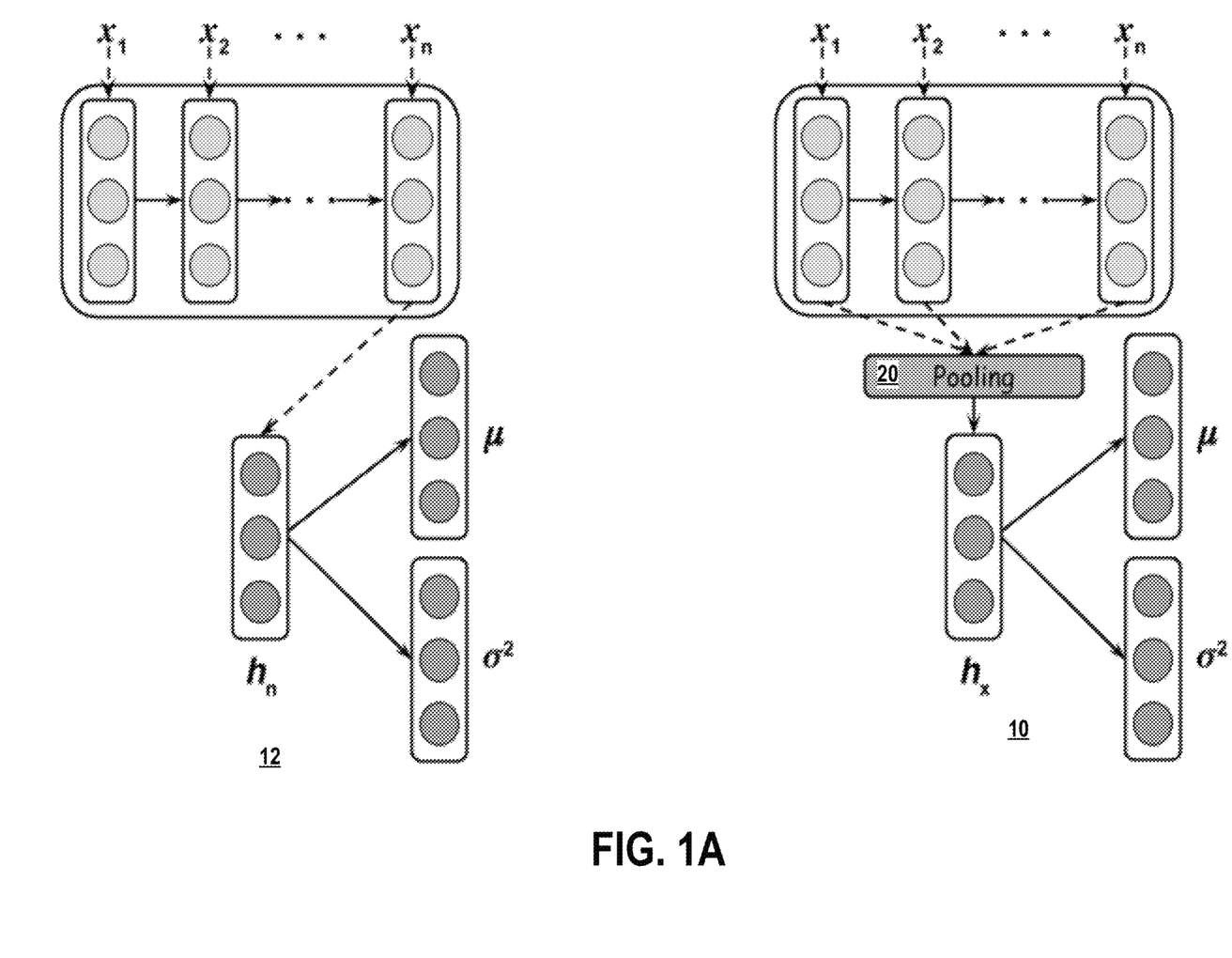
FIG. 1A is a comparative diagram showing block schematics of example architectures, including an example architecture 12 of a recognition model for a sequence VAE in which only the last hidden state $h_n$ from encoder RNN is used as feature representation to compute the mean $\mu$ and variance $\sigma^2$ parameters of approximate posteriors $q_\phi(z|x)$, and an example architecture with a proposed modification of how the feature vector $h_x$ for sequence x is computed with pooling operations according to some embodiments.

FIG. 1A is a block schematic diagram showing different systems. There is shown an example architecture 12 of a recognition model for a sequence VAE in which only the last hidden state $h_n$ from encoder RNN is used as feature representation to compute the mean $\mu$ and variance $\sigma^2$ parameters of approximate posteriors $q_\phi(z|x)$. There is also shown an example architecture 10 of a recognition model with modification for how the feature vector $h_x$ for sequence x is computed. Specifically, $h_x$ can be computed by a processor that performs pooling operations 20 over the temporal dimension of all hidden states $h=[h_1, h_2, \ldots, h_n]$ output by RNN encoder, which is then used to compute parameters $\mu$ and $\sigma$.

Figure 1B:
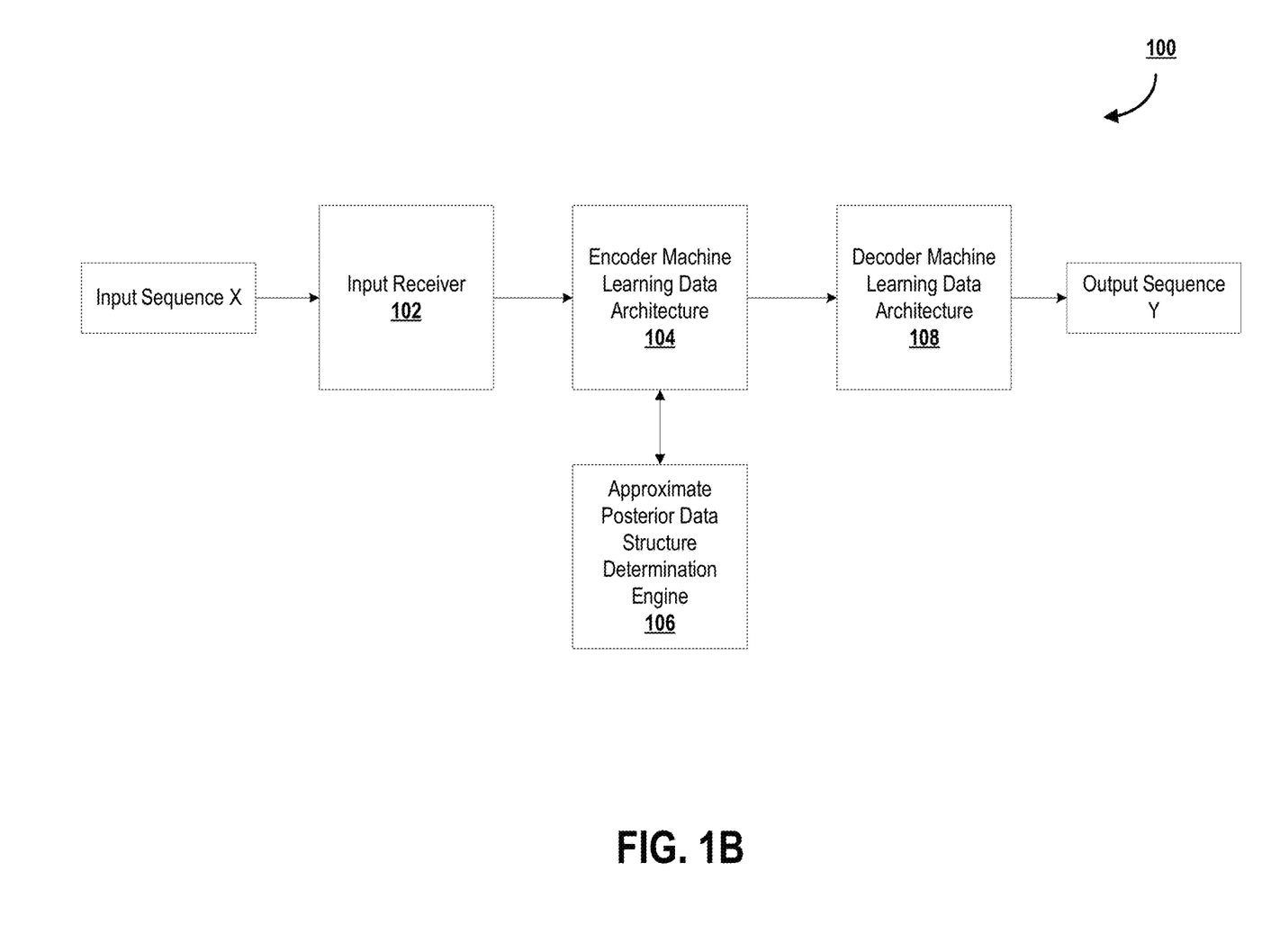
FIG. 1B is a block schematic diagram of an example system, according to some embodiments.

FIG. 1B is a block schematic diagram of an example system 100, according to some embodiments. In FIG. 1B, variational autoencoder system is shown that is configured for conducting text sequence machine learning, according to some embodiments. The system 100 can have storage devices connected to processors configured with instructions to implement different components and operations.

An input sequence $x=[x_1, x_2, \ldots, x_n]$ is received at input receiver 102. The input receiver 102 can receive the input sequence from another component or from reading data from storage devices. A encoder machine learning data architecture 104 is configured to receive the input sequence, and process the input sequence to produce a series of hidden states $h_x=[h_1, h_2, \ldots, h_n]$. The encoder machine learning data architecture (or encoder) generates the feature vector for the series of hidden states $h_x$ by performing pooling operations over a temporal dimension of all hidden states it outputs. The encoder machine learning data architecture 104 stores the feature vector for the series of hidden states $h_x$ in memory and can also store data about the states. The encoder does not only consider the last hidden state and instead computes feature vectors a series hidden states over the temporal dimension of the hidden states to extract and capture additional data for variability of the input sequence. The series of hidden states can be arranged by temporal dimension.

The encoder machine learning data architecture 104 (which can also be referred to as encoder herein) configures a processor for different pooling operations in variant embodiments. The processor uses pooling operations to produce a feature vector for an input sequence as a combined representation of the sequence. Example embodiments of pooling operations are max pooling, average pooling, absolute pooling, and so on.

The encoder machine learning data architecture 104 configures the processor to implement pooling operations over a temporal dimension of all hidden states to generate the feature vector. Each hidden state can have multiple dimensions. For example, the series of hidden states can have multiple temporal dimensions. A temporal dimension of a hidden state can be referred to as a k-th dimension of the hidden state. The feature vector $h_x^k$ can also have corresponding multiple temporal dimensions. A temporal dimension of the feature vector feature vector for the hidden states can be referred to as a k-th dimension of the feature vector $h_x^k$. In example embodiments, the processor can compute a k-th dimension of feature vector $h_x^k$ using a pooling operation of the k-th dimension of all hidden states. The feature vector can have temporal dimensions corresponding to the temporal dimensions of the hidden states. The pooling operation can be the mean of the k-th dimension of all hidden states. The pooling operation can be the maximum value along the k-th dimension of all hidden states. There can be other pooling operations to aggregate the k-th dimension of all hidden states to compute the k-th dimension of the feature vector $h_x^k$.

The encoder machine learning data architecture 104 configures the processor to generate the feature vector using data from different temporal dimensions of the hidden states. The processors is not limited to computations using only the last hidden state in view of the limitations described herein.

An approximate posterior data structure determination engine 106 has a processor that connects to the memory to extract from the series of hidden states $h_x$, a mean and a variance parameter, and to encapsulate the mean and the variance parameter as an approximate posterior data structure. The approximate posterior data structure determination engine 106 can store the computed data in the memory.

A decoder machine learning data architecture 108 is configured to generate output data structures based on the approximate posterior data structure and the series of hidden states from the encoder machine learning data architecture 104. The output data structures can be adapted to be similar to the input sequence or in some embodiments, generated new sequences that are based on properties of the input sequence but are distinct (e.g., non-identical).

Under the typical architecture, the last hidden state $h_n$ is usually taken as the feature vector to compute the mean and variance parameters of approximate posterior as shown by the example architecture 12 of FIG. 1A, thus:

$$q_\phi(z|x) = \mathcal{N}(\mu_\phi(x), \sigma_\phi^2(x))$$

$$s.t. \; \mu_\phi(x) = W_1 * h_n + b_1$$

$$\sigma_\phi^2(x) = W_2 * h_n + b_2$$

where $W_1$, $b_1$ and $W_2$, $b_2$ are learnable parameters of the corresponding linear transformations for mean and variance respectively.

However, using the last hidden state as feature representation could be potentially problematic, as RNNs, including its variants such as LSTMs and GRUs, are known to have issues retaining information further back in history.

Thus, the last hidden state $h_n$ tends to be dominated by the last few tokens from the input sequence.

RNNs might create a feature space with not enough dispersion when only the last hidden states are used to compute means and variances. As a result, when used to compute the parameters for approximate posteriors, vectors from such a feature space would result in posterior distributions that are concentrated in a small region in posterior space, with high chances of overlap for different input sequences.

Latent codes sampled from different approximate posteriors would look somewhat similar to each other and thus provide very little useful information about the data to the decoder 108.

Since no useful information could be conveyed by the latent variables, the optimization might push approximate posteriors forwards the prior distribution in order to minimize the overall ELBO objective, causing training to reach undesirable local optimum that is posterior collapse.

Increasing Feature Space Dispersion

Embodiments described herein provide an alternative for generating feature vectors for sequence $x = [x_1, x_2, \ldots, x_n]$ than only using the last hidden state $h_n$. The encoder has a processor that can read an input sequence $x = [x_1, x_2, \ldots, x_n]$ to generate a series of hidden states $h_x = [h_1, h_2, \ldots, h_n]$ for the input sequence by performing pooling operations over a temporal dimension of the hidden states. The encoder does not only use the last hidden state $h_n$ and instead uses data from multiple temporal dimensions of hidden states.

System 100 can make use of information contained in all hidden states rather than just the last one using pooling operations. System 100 can make use of information across a temporal dimension of the hidden states and not just the last one. The system 100 can process a sequence and produce a feature vector as a combined representation of the sequence.

System 100 can generate feature vector $h_x$ for sequence x. The feature vector is for a series of hidden states for the input sequence. For example, in some embodiments, system 100 can generate feature vector $h_x$ for sequence x as:

$$h_x = \text{aggregate}([h_1, h_2, \ldots, h_n])$$

where aggregate is some function that takes a sequence of vectors of variable lengths and produces a single combined representation.

There are several options for the choice of aggregate function. For example, in some embodiments, system 100 can learn the aggregate function.

For text classification, a system can jointly learn a self-attention module to perform feature aggregation for the recognition model. However, it might introduce a significant amount of additional parameters to the sequence VAE model, making the already difficult optimization problem even more challenging.

For text classification, in some embodiments system 100 can use a class of functions that adds no additional parameters to the model architecture: pooling. Accordingly, system 100 can generate feature vector $h_x$ for sequence x using pooling operations. For example, the system 100 can process a sequence of vectors of variable lengths and produce a combined representation of the sequence of vectors of variable lengths as the feature vector.

The system 100 can generate feature vector $h_x$ for sequence x such that the k-th dimension of feature vector $h_x^k$ is computed using a pooling operation of the k-th dimension of all hidden states. The feature vector can be for a series of hidden states for the sequence. The feature vector can be a combined representation of the sequence. The system 100 can produce a combined representation of a sequence of vectors of variable lengths as the feature vector.

Pooling applications can be used in computer vision. Pooling applications can be used in NLP such as multi-task learning and learning pre-trained universal sentence encoders, and in some cases has shown superior performance over attention-based methods, particularly in settings where size of the dataset is limited.

Specifically in the context of sequence VAEs, pooling is performed over the temporal dimension of hidden states $h = [h_1, h_2, \ldots, h_n]$ produced by encoder RNN, as illustrated by the right side of FIG. 1A.

System 100 can use different types of pooling functions for the aggregate function to generate the feature vector for the input sequence across the temporal dimension of the hidden states. System 100 can generate the feature vectors using different pooling operations on hidden states for the input sequence. System 100 can use three different types of pooling functions for operations, for example. For example, system 100 can use average pooling (AvgPool), max pooling (MaxPool), sign-preserved absolute pooling (AbsPool) functions, for example.

The max pooling (MaxPool) function performs max pooling based on the absolute values of each element while preserving the signs of pooled elements, which is referred to as sign-preserved absolute pooling (AbsPool).

Specifically, for the k-th dimension of feature vector $h_x^k$, the processor can use average pooling to compute it by taking the mean of the k-th dimension of all hidden states, i.e.

$$h_x^k = \frac{1}{n}\sum_{i=1}^n h_i^k.$$

On the other hand, max pooling computes $h_x^k$ by taking the maximum value along k-th dimension, namely $h_x^k = \max(h_1^k, h_2^k, \ldots, h_n^k)$. For sign-preserved absolute pooling, $h_x^k$ is computed by taking the $h_i^k$ whose absolute value is the largest.

Note that the sign of the selected $h_i^k$ is not modified in this case.

Because of the central limit theorem, average pooling over a long enough sequence can have insufficient dispersion. MaxPool and AbsPool could alleviate this problem as they return extreme statistics. Furthermore, because longer sequences can have more extreme max (and min) values, MaxPool and AbsPool can reflect the input sequence lengths as well.

Visualizing Feature Space

Figure 2:
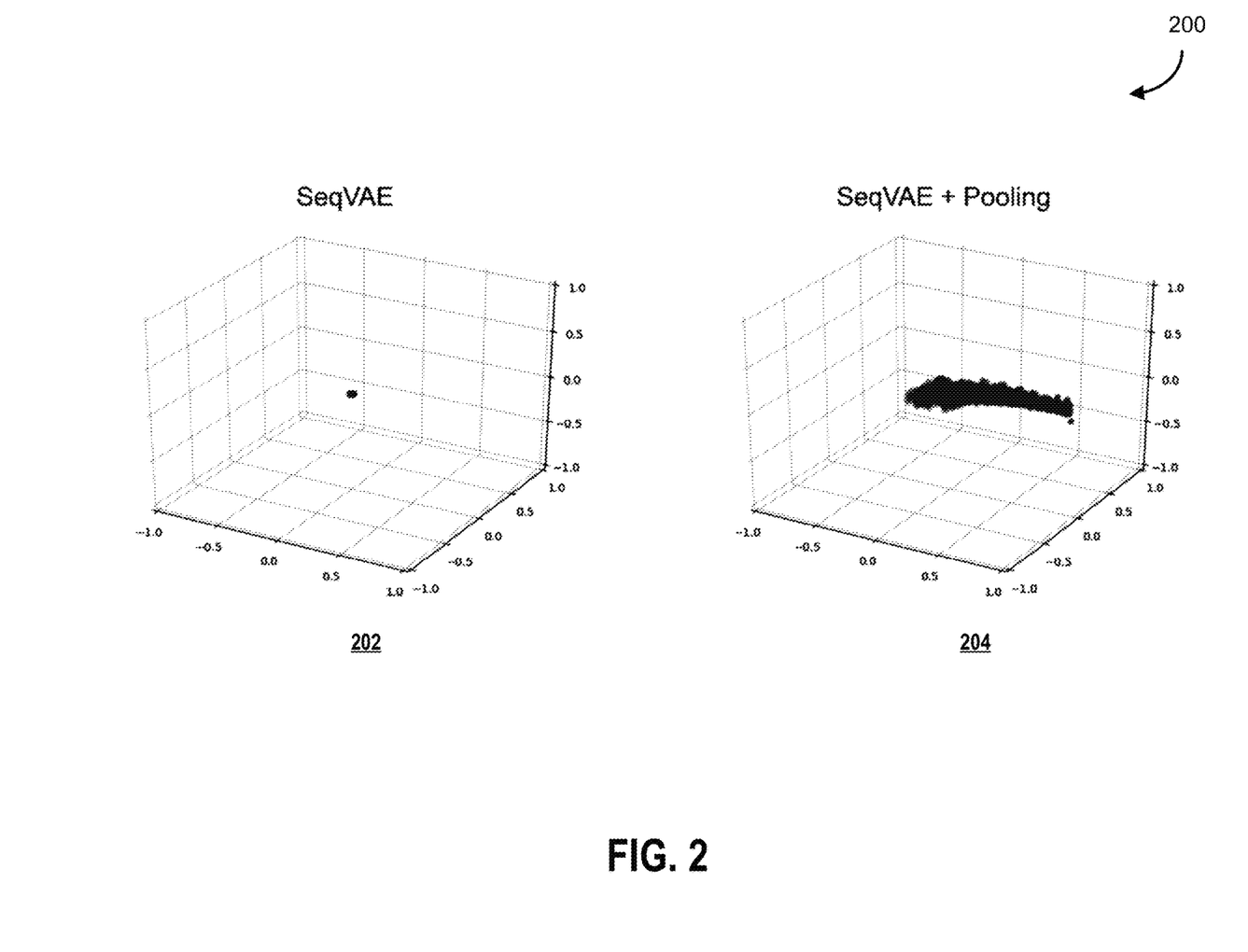
FIG. 2 is a graph diagram of feature space visualizations for a typical sequence VAE and one plus pooling, according to some embodiments.
Figure 3A:
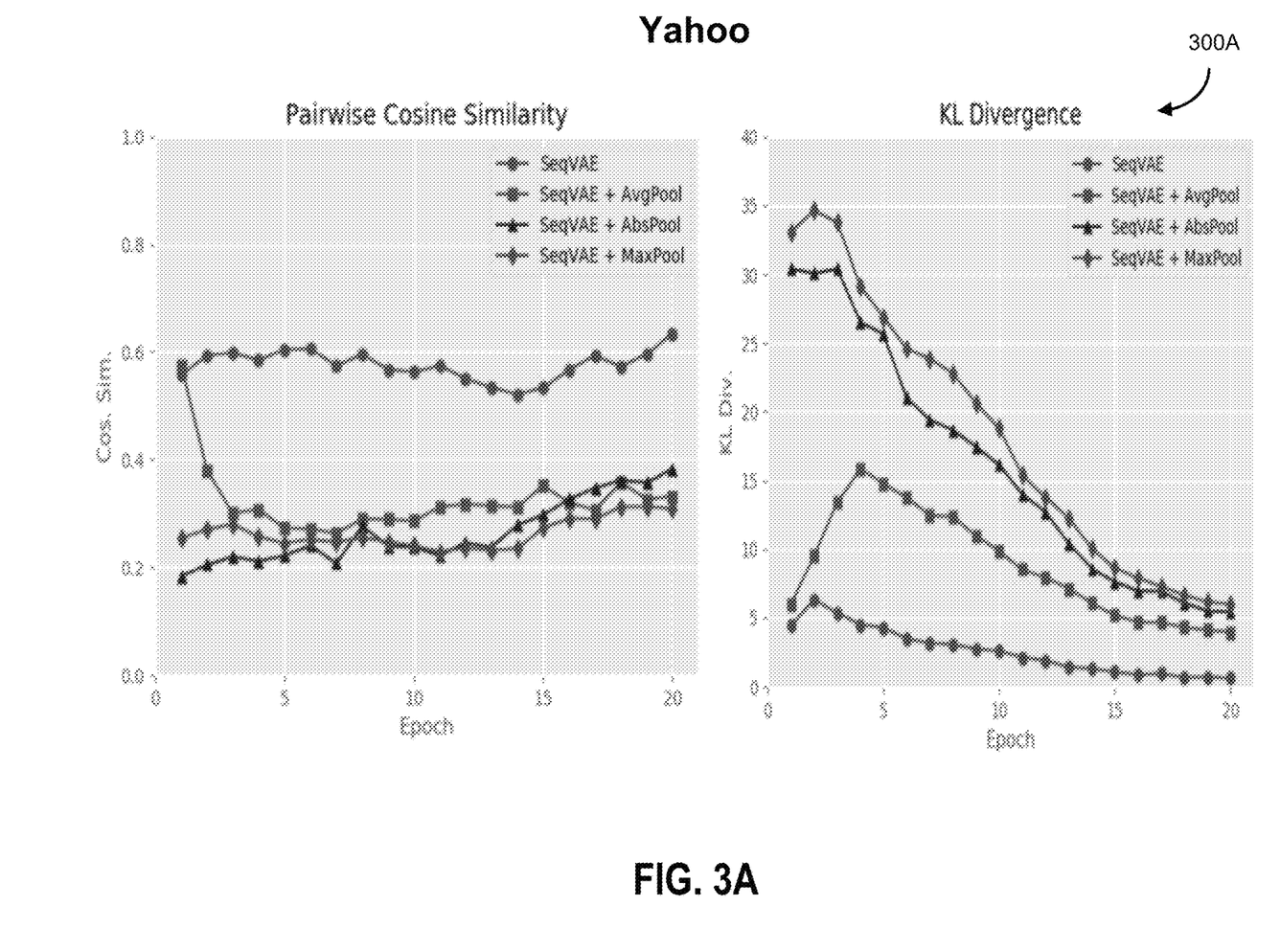
FIG. 3A is a graph diagram of pairwise cosine similarities between feature vectors and KL divergences for validation sets on the Yahoo data set, according to some embodiments.
Figure 3B:
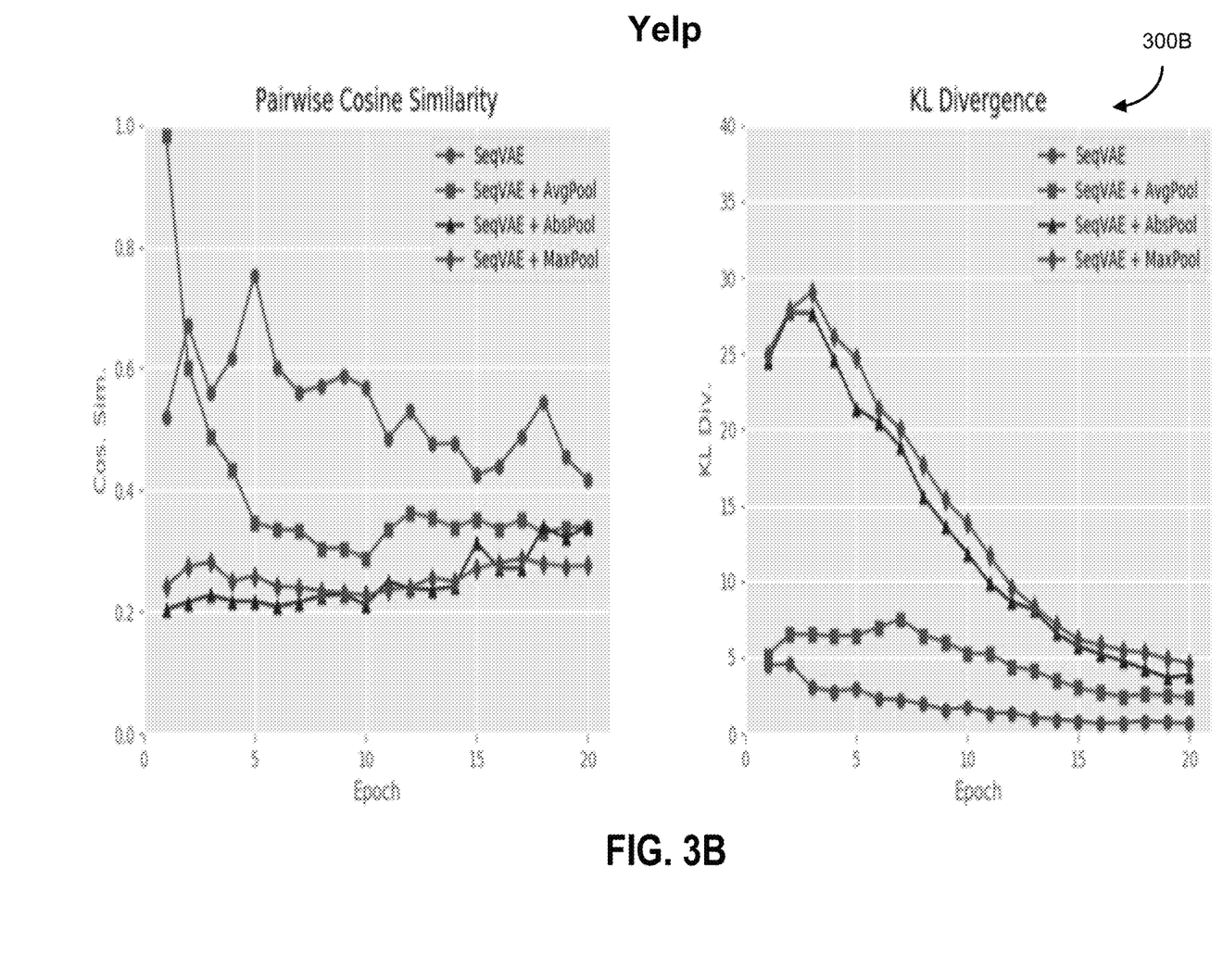
FIG. 3B is a graph diagram of pairwise cosine similarities between feature vectors and KL divergences for validation sets on the Yelp data set, according to some embodiments.

FIG. 2 and FIGS. 3A and 3B demonstrate examples of the dispersion of features with and without pooling techniques.

FIG. 2 is a graph diagram 200 of feature space visualizations 202 for an example sequence VAE and feature space visualizations 204 for an example sequence VAE plus pooling, according to some embodiments. For the regular Seq-VAE, feature representations 202 for all sequences have collapsed to a very small region in feature space. With pooling, the occupied region in feature space appears to be dense with variations preserved along all axes to various extents.

FIGS. 3A and 3B are graph diagrams 300A and 300B of pairwise cosine similarities between feature vectors and KL divergences for validation sets. FIG. 3A is a Yahoo set and FIG. 3B is Yelp set as illustrative examples.

Notice that the cosine similarities between different sequences remain at a higher level as the training progresses. As a result, the KL term quickly collapses to close to zero. On the other hand, pooling is able to maintain the dispersion in feature space, thus helping to avoid posterior collapse.

Figure 4:
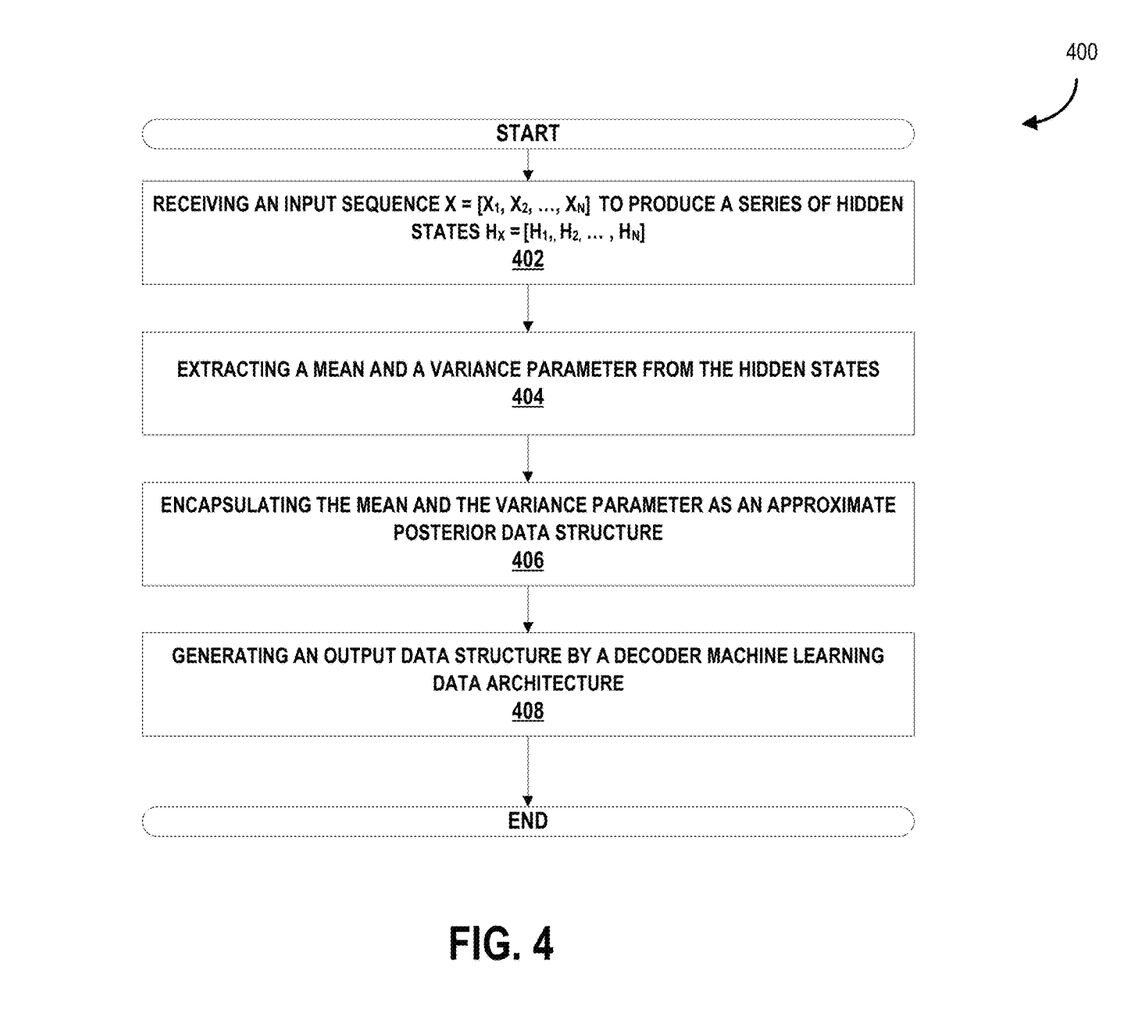
FIG. 4 is a process diagram of an example method for a machine learning architecture with variational autoencoder pooling, according to some embodiments.

FIG. 4 is a process diagram of an example method 400 for machine learning architecture with variational autoencoder pooling, according to some embodiments.

At 402, a processor receives an input sequence $x=[x_1, x_2, \ldots, x_n]$ or access the input sequence in memory. The processor can be integrated with an input receiver 102, for example, or can be integrated with an encoder 104. The processor processes the input sequence to produce a feature vector (for the sequence) for a series of hidden states $h_x=[h_1, h_2, \ldots, h_n]$. The a k-th dimension of feature vector $h_x^k$ is computed by the processor using a pooling operation of the k-th dimension of all hidden states. The processor generates the series of hidden states $h_x$ by performing pooling operations over a temporal dimension of all hidden states output by the encoder machine learning data architecture.

The processor can generate the series of hidden states $h_x$ using an aggregate function ($[h_1, h_2, \ldots, h_n]$). In some embodiments, the processor can use one or more pooling functions for the pooling operations across a temporal dimension of the hidden states to generate feature vector $h_x$. The processor can use different pooling functions, such as an average pooling function, a max pooling function, or a variant max pooling function that is performed based on absolute values of each element while preserving signs of the pooled elements.

At 404, the processor can extract a mean and a variance parameter from the hidden states. At 406, the processor can encapsulate the mean and the variance parameter as an approximate posterior data structure. The processor can provide the approximate posterior data structure to the decoder 108. At 408, a generated output sequence is generated by the decoder 108 machine learning data architecture. The decoder 108 generates the output sequence based on data received as outputs of the encoder 104.

Figure 5:
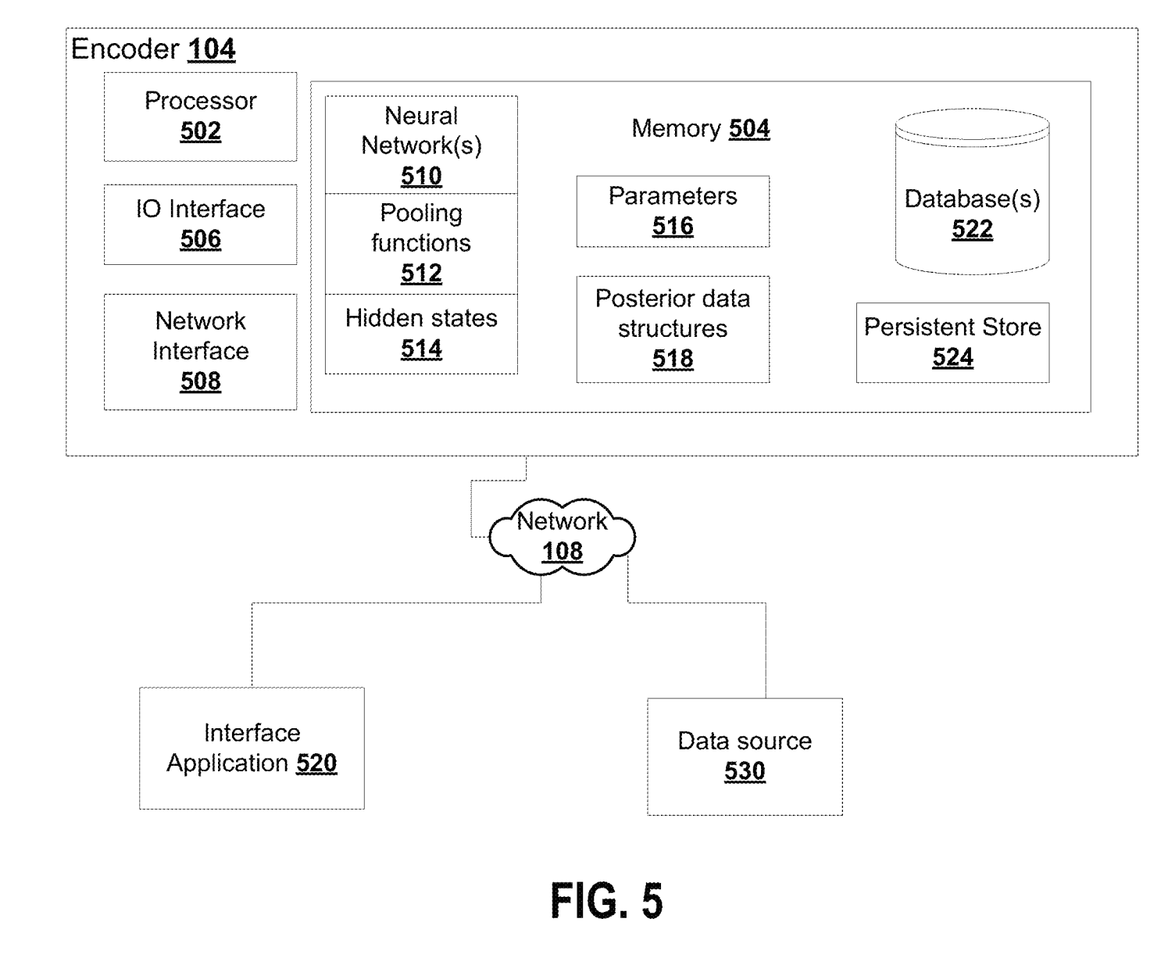
FIG. 5 is a diagram of an example computing device, according to some embodiments.

FIG. 5 is a diagram of an example encoder 104 that can be implemented with computing device components according to some embodiments. As depicted, the example encoder 104 includes at least one processor 502, memory 504, at least one I/O interface 506, and at least one network interface 508.

The encoder 104 can be implemented as part of a specially configured computing device, which, for example, can be part of a specialized data appliance residing in a data center that is adapted for providing an improved variational autoencoder that is less susceptible to posterior collapse.

The encoder 104 can have a processor 502 particularly configured, in some embodiments, to implement pooling operations as an intermediary in the machine learning processing. The processor 502 can receive text input from I/O interface 506 or one network interface 508, or access input from memory 504. The processor 502 can process the data using its improved architecture, and generate text output for transmission to other (internal or external components) or storage in memory 504.

The processor 502 can receive an input sequence $x=[x_1, x_2, \ldots, x_n]$ I/O interface 506 or one network interface 508 or access the input sequence in memory 504. The processor 502 can process the input sequence to produce a series of hidden states 514 of one or more neural networks 510. The processor generates the series of hidden states $h_x$ 514 using one or more pooling functions 512 stored as instructions. The pooling functions 512 can apply over a temporal dimension of all hidden states output by the encoder 104.

The processor 502 can generate the series of hidden states $h_x$ 514 using an aggregate function ($[h_1, h_2, \ldots, h_n]$). In some embodiments, the processor 502 can use one or more pooling functions 512 to generate the series of hidden states $h_x$ 514. The processor 502 can use different pooling functions 512, such as an average pooling function, a max pooling function, or a variant max pooling function that is performed based on absolute values of each element while preserving signs of the pooled elements.

The processor 502 can extract parameters 516 such as mean and variance parameters from the hidden states 514. The processor 502 can access and store posterior data structure 518. The encoder 104 can provide the approximate posterior data structure to the decoder 108, for example, the generate an output sequence. The decoder 108 generates the output sequence based on data received as outputs of the encoder 104.

In an aspect, embodiments described herein can provide a computer systems and non-transitory computer readable medium storing representations of hidden layers of a trained encoder machine learning data architecture for a processor. An encoder machine learning data architecture is trained based on receiving an input sequence x=[x1, x2, . . . , xn], to produce a feature vector for a series of hidden states hx=[h1, h2, . . . , hn], wherein the series of hidden states hx is generated by the processor performing pooling over a temporal dimension of all hidden states output. The processor can extract from the series of hidden states hx, a mean and a variance parameter. The processor can encapsulate the mean and the variance parameter as an approximate posterior data structure for the variational autoencoder.

In some embodiments, the processor 502 configures the variational autoencoder conduct text sequence machine learning. The processor 502 executes machine interpretable instruction sets to read an input sequence to generate a feature vector for the input sequence by performing pooling operations over a temporal dimension of hidden states. The processor 502 takes a sequence of vectors of variable lengths and produces a combined representation of the sequence of vectors of variable lengths as the feature vector. The processor 502 can extract from the feature vector a mean and a variance parameter and encapsulate the mean and the variance parameter as an approximate posterior data structure for the variational autoencoder.

In some embodiments, a k-th dimension of feature vector is computed by the processor 502 using a pooling operation of the k-th dimension of all hidden states. In some embodiments, the pooling operation is the mean of the k-th dimension of all hidden states. In some embodiments, the pooling operation is the maximum value along the k-th dimension of all hidden states. In some embodiments, the pooling operation is an aggregate of the k-th dimension of all hidden states. Other pooling operations can be performed by the processor to generate the feature vector for the variational autoencoder.

Each processor 502 may be, for example, microprocessors or microcontrollers, a digital signal processing (DSP) processor, an integrated circuit, a field programmable gate array (FPGA), a reconfigurable processor, a programmable read-only memory (PROM), thereof.

Memory 504 may include databases 522 and persistent store 524. Memory 504 may include computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables encoder 104 to interconnect with one or more input devices, such as a keyboard, mouse, camera, touch screen and a microphone, or with one or more output devices such as a display screen and a speaker. The I/O interface 506 enables encoder 104 to receive input and transmit output for different computing devices.

Each network interface 508 enables computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. The network interface 508 enables encoder 104 to receive input and transmit output for different external devices.

Results

TABLE 1 showcases the main unsupervised learning results with the proposed methods comparing to SeqVAE baseline.

| Model | Yahoo | | | | Yelp | | | |
|---|---|---|---|---|---|---|---|---|
| | NLL | KL | MI | AU | NLL | KL | MI | AU |
| SeqVAE | 328.59 | 0.01 | 0.02 | 0 | 358.14 | 0.27 | 0.29 | 1 |
| SeqVAE + AvgPool | 327.80 | 2.35 | 1.62 | 5 | 357.47 | 1.63 | 1.23 | 5 |
| SeqVAE + AbsPool | 327.62 | 3.34 | 2.34 | 7 | 356.90 | 2.00 | 1.66 | 7 |
| SeqVAE + MaxPool | 327.49 | 3.50 | 2.29 | 9 | 356.38 | 3.12 | 2.22 | 8 |

Table 1 illustrates example experimental results on two benchmark datasets: Yahoo and Yelp as shown in FIGS. 3A and 3B. Notice that the KL divergence for sequence VAE is close to zero on both datasets, indicating that optimization has arrived at the degenerate solution of posterior collapse. On the other hand, adding pooling operations as part of the processing can help the model to avoid reaching such undesirable local optimum, achieving non-zero KL divergence and significantly better estimated data log likelihood.

Text Classification

TABLE 2 shows that the methods also allow improved downstream classification accuracy.

| Model | Accuracy |
|---|---|
| bi-LSTMs | 59.92% |
| SeqVAE (Yelp) | 26.19% |
| SeqVAE + MaxPool (Yelp) | 53.40% |
| SeqVAE + MaxPool (Yahoo) | 40.67% |

Table 2 shows that test classification accuracies on Yelp. SeqVAEs with MaxPool are able to capture useful information in its latent space, thus achieve reasonable performances compared to supervised baseline.

TABLE 3 shows that although pooling is permutation invariant, pooling of RNN hidden features (as generated by one or more processors) does capture order information. The order data can be captured across the temporal dimension. Accordingly, embodiments described herein can retain order data during processing.

| Dataset | Pooling | Origin | Shuffle | Diff. |
|---|---|---|---|---|
| Yahoo | None | 328.59 | 328.65 | 0.06 |
| | Avg | 327.80 | 328.03 | 0.24 |
| | Abs | 327.62 | 327.82 | 0.20 |
| | Max | 327.49 | 327.56 | 0.07 |
| Yelp | None | 358.14 | 358.14 | 0.00 |
| | Avg | 357.47 | 357.75 | 0.28 |
| | Abs | 356.90 | 357.11 | 0.21 |
| | Max | 356.38 | 357.13 | 0.75 |

Table 3 shows estimated log likelihoods on test data. Values in column Shuffle are computed by randomly permuting the input sequences to recognition models. For both datasets, models with pooling can be at least just as negatively affected by the permutations as the ones without pooling, often times even more so.

The described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer implemented system for a variational autoencoder to conduct text sequence machine learning, the system comprising:
   a computer memory; and
   a processor operating in conjunction with the computer memory, the processor executing machine interpretable instruction sets stored on the memory to provide a variational autoencoder to conduct text sequence machine learning, the variational autoencoder having an encoder and a decoder, wherein the encoder reads an input sequence x=[x1, x2, . . . , xn] and generates a feature vector $h_x^k$ for a series of hidden states hx=[h1, h2, . . . , hn] for the input sequence by performing pooling operations over multiple temporal dimensions of the hidden states, wherein the series of hidden states hx is arranged by the multiple temporal dimensions, wherein the feature vector $h_x^k$ for the series of hidden states hx=[h1, h2, . . . , hn] has corresponding multiple temporal dimensions such that a temporal dimension of the feature vector $h_x^k$ is referred to as a k-th dimension of the feature vector $h_x^k$, wherein the processor computes the k-th dimension of the feature vector $h_x^k$ using a pooling operation of the k-th dimension of the hidden states, wherein the memory stores the feature vector for the series of hidden states hx; and
   the processor further provides an approximate posterior data structure determination engine to extract from the feature vector for the series of hidden states hx, a mean and a variance parameter, and to encapsulate the mean and the variance parameter as an approximate posterior data structure for the variational autoencoder to conduct the text sequence machine learning;
   wherein the variational autoencoder is a class of latent variable generative models; and
   wherein the decoder is configured to generate output data based on the approximate posterior data structure and the feature vector for the series of hidden states hx.

2. The system of claim 1, wherein the encoder machine learning data architecture is configured to output a hidden representation based on the feature vector of the series of hidden states hx.

3. The system of claim 2, comprising a decoder machine learning data architecture that receives the hidden representation from the encoder and generates a reconstructed output sequence.

4. The system of claim 3, wherein the reconstructed output sequence is a new generated sequence that is inferred based on the hidden representation that is distinct from the input sequence.

5. The system of claim 1, wherein the feature vector for the series of hidden states hx=aggregate([h1, h2, . . . , hn]).

6. The system of claim 5, wherein the aggregate function is an average pooling function.

7. The system of claim 5, wherein the aggregate function is a max pooling function.

8. The system of claim 7, wherein the max pooling function is performed based on absolute values of each element while preserving signs of the pooled elements.

9. The system of claim 1, wherein the input sequence is a sequence of string or character based tokens.

10. A computer implemented method for providing a variational autoencoder for conducting text sequence machine learning using, the method comprising:
    providing, using a processor, a variational autoencoder to conduct text sequence machine learning, the variational autoencoder having an encoder and a decoder;
    reading an input sequence x=[x1, x2, . . . , xn] using the encoder provided by the processor that accesses memory storing the input sequence;
    generating a feature vector $h_x^k$ for a series of hidden states hx=[h1, h2, . . . , hn] using the encoder provided by the processor to read the hidden states from the memory and perform pooling operations over multiple temporal dimensions of all hidden states, wherein the series of hidden states hx is arranged by the multiple temporal dimensions, wherein the feature vector $h_x^k$ for the series of hidden states hx=[h1, h2, . . . , hn] has corresponding multiple temporal dimensions such that a temporal dimension of the feature vector $h_x^k$ is referred to as a k-th dimension of the feature vector $h_x^k$, wherein the processor computes the k-th dimension of the feature vector $h_x^k$ using a pooling operation of the k-th dimension of the hidden states; and
    extracting from the series of hidden states hx, a mean and a variance parameter using the processor and encapsulating the mean and the variance parameter as an approximate posterior data structure for the variational autoencoder to conduct the text sequence machine learning, wherein the variational autoencoder is a class of latent variable generative models;
    generating, using the decoder, output data based on the approximate posterior data structure and the feature vector for the series of hidden states hx.

11. The computer implemented system for the variational autoencoder to conduct text sequence machine learning of claim 1, wherein the encoder comprises an encoder network, wherein the decoder comprises a decoder network, wherein the variational autoencoder receives input, processes the input using the encoder network to compute latent variables, and generates output using the decoder network and the computed latent variables based on properties of the input sequence.

12. The method of claim 10, comprising determining a hidden representation based on the feature vector for the series of hidden states hx.

13. The method of claim 12, wherein the hidden representation from the encoder is utilized to generate a reconstructed output sequence.

14. The method of claim 13, wherein the reconstructed output sequence is a new generated sequence that is inferred based on the hidden representation that is distinct than the input sequence.

15. The method of claim 10, wherein hx=pool([h1, h2, . . . , hn]).

16. The method of claim 10, wherein hx=aggregate([h1, h2, . . . , hn]).

17. The method of claim 16, wherein the aggregate function is an average pooling function.

18. The method of claim 16, wherein the aggregate function is a max pooling function.

19. The method of claim 18, wherein the max pooling function is performed based on absolute values of each element while preserving signs of the pooled elements.

20. The method of claim 10, wherein the input sequence is a sequence of string or character based tokens.

21. A non-transitory computer readable medium storing machine interpretable instructions, which when executed by a processor, cause the processor to perform steps of a computer implemented method for a variational autoencoder for conducting text sequence machine learning, the method comprising:

provide, using a processor, a variational autoencoder to conduct text sequence machine learning, the variational autoencoder having an encoder and a decoder;

loading an input sequence x=[x1, x2, . . . , xn] at the processor;

generating a feature vector $h_x^k$ for a series of hidden states hx=[h1, h2, . . . , hn] using the encoder provided by the processor to perform pooling over multiple temporal dimensions of all hidden states, wherein the series of hidden states hx is arranged by the multiple temporal dimensions, wherein the feature vector $h_x^k$ for the series of hidden states hx=[h1, h2, . . . , hn] has corresponding multiple temporal dimensions such that a temporal dimension of the feature vector $h_x^k$ is referred to as a k-th dimension of the feature vector $h_x^k$, wherein the processor computes the k-th dimension of the feature vector $h_x^k$ using a pooling operation of the k-th dimension of the hidden states; and extracting from the series of hidden states hx, a mean and a variance parameter, and using the processor to encapsulate the mean and the variance parameter as an approximate posterior data structure for the variational autoencoder to conduct the text sequence machine learning, wherein the variational autoencoder is a class of latent variable generative models;

generating, using the decoder, output data based on the approximate posterior data structure and the feature vector for the series of hidden states hx.

* * * * *